United States Patent

[11] 3,622,220

[72] Inventor Herwig W. Kogelnik
Fair Haven, N.J.
[21] Appl. No. 864,715
[22] Filed Oct. 8, 1969
[45] Patented Nov. 23, 1971
[73] Assignee Bell Telephone Laboratories, Incorporated
Murray Hill, Berkeley Heights, N.J.

[54] HOLOGRAPHIC OPTICAL POLARIZERS AND BEAM SPLITTERS
7 Claims, 4 Drawing Figs.

[52] U.S. Cl. ................................................ 350/3.5,
350/147, 350/162
[51] Int. Cl. ...................................................... G02b 5/18,
G02b 5/30, G02b 27/28
[50] Field of Search............................................ 350/3.5,
147, 149, 152, 154, 161, 162

[56] References Cited
UNITED STATES PATENTS
3,291,550 12/1966 Bird et al. ..................... 350/147
3,407,405 10/1968 Hoadley ........................ 350/162

OTHER REFERENCES
Lohman, Applied Optics, Vol. 4, No. 12, Dec. 1965 pp. 1667–1668
George et al., Applied Physics Letters, Vol. 9, No. 5, Sept. 1966, pp. 212–215.
Kurtz, Applied Physics Letters, Vol. 14 No. 2, Jan. 1969, pp. 59–62.

Primary Examiner—David Schonberg
Assistant Examiner—Ronald J. Stern
Attorneys—R. J. Guenther and E. W. Adams, Jr.

ABSTRACT: Holographic optical components such as polarizers and beam splitters are made by the interference of a pair of coherent light beams polarized at 90° to their plane of incidence on a transparent thick holographic medium, and intersecting each other at 90° within the medium.

INVENTOR
H. W. KOGELNIK
BY
ATTORNEY

HOLOGRAPHIC OPTICAL POLARIZERS AND BEAM SPLITTERS

BACKGROUND OF THE INVENTION

This invention relates to holographic devices and, more particularly, to optical components made from holograms.

In the present state of the art, optical components such as, for example, polarizers, beam splitters, and the like may take any of a large number of forms. Polarizers, for example, may be made from simple polarizing plastic material or the equivalent thereof. These have the advantages of relatively low cost and large aperture. However, they have the disadvantage that they absorb or attenuate a portion of the light that is of the desired polarization, hence their efficiency is low. Prismatic type polarizers, on the other hand, have relatively high efficiencies, but small aperture, and are, in general, fairly expensive.

In the case of polarization beam splitters, in general they are prismatic in nature and hence expensive, as well as having relatively small apertures. In addition, certain types, such as Wollaston prism, have only a small angular separation between the beams.

In general it can be stated that prism type optical components are the most efficient, but they are expensive and their cost increases with increased aperture size. Furthermore, there is an upper limit on the aperture size determined by the size of the crystals available for manufacturing the particular component.

The recent surge of interest in holography, stimulated at least in part by the availability of coherent light sources, has led to much experimentation and investigation of the properties of the unique phenomena characteristic of holograms. The simplest hologram results from the interference pattern produced by two plane waves derived from the same or similar coherent light sources. This interference pattern is recorded on a suitable recording medium, such as, for example, a photographic emulsion, which when properly developed, yields a permanent record of the content of the interfering waves. Subsequent illumination of this record by one of the waves results in a reconstruction of the other wave.

Holograms generally are of two types, planar, as in the case of a thin photographic emulsion, and volume type, where the recording medium is thick relative to the wavelength of the light. In the first case, the recording can be considered to be a surface transmission grating, but in the second case, Bragg planes, parallel to each other and perpendicular to the plane of incidence of the two light beams are generated. In this case the incident and exiting light must obey the Bragg condition of equiangle reflection. Various types of materials may be used to form these thick holograms, such as, for example, thick photographic emulsions, dichromated gelatin, and photochromic glasses.

Experiments have shown that thick holograms are useful in a variety of optical applications, one of the most noteworthy being as a diffraction grating of not only outstanding precision, but also of simple and inexpensive fabrication.

SUMMARY OF THE INVENTION

The present invention is based upon the discovery that if a thick hologram is formed observing certain constraints on the interfering light beams, the hologram possesses the property of distinguishing between light beams of different polarities, diffracting light of one polarity and transmitting light of the other polarity. As a consequence, efficient polarizers and beam splitters having large apertures and which are relatively inexpensive to manufacture are realized.

In a first illustrative embodiment of the invention, a thick hologram grating is formed in dichromated gelatin or other high efficiency recording medium by two coherent light beams polarized perpendicular to the plane of incidence of the two beams. The efficiency of the material depends upon its retaining a high degree of transparency after processing. The angle between the two incident beams is such that they interfere with each other at an angle of 90° within the medium, thereby creating a pattern of regularly spaced fringe planes of index of refraction change within the medium oriented perpendicularly with respect to the plane of incidence and extending transversely across the thickness dimension of the medium. These planes bisect the angle between the incident beams. With a grating formed in this manner, the Bragg angle is approximately 45°.

The grating thus formed is utilized between a source of coherent light and a utilization device. The grating is oriented with respect to the light source such that the angle of incidence of the light is the same as was the incidence angle for one of the two beams used in forming the grating. With such an orientation, incident light with a perpendicular polarization is substantially completely diffracted, while light or a parallel polarization is substantially completely transmitted. The utilization device is oriented relative to the polarizer to receive the diffracted beam, which contains only perpendicularly polarized light.

In a second illustrative embodiment of the invention, a beam splitter comprises a pair of thick hologram gratings formed or superimposed in the recording medium. The first grating is formed by a pair of beams oriented along two of three orthogonal axes, and polarized perpendicular to the plane containing the two beams. The holographic plate is oriented such that the plane thereof forms equal angles with each of the three orthogonal axes. The second holographic grating is formed by a pair of beams, one of which is directed along the third orthogonal axis and the other of which is along one of the other orthogonal axes. The two beams are polarized perpendicularly to the plane containing the two beams.

A beam of light directed along one of the axes through the plate is split in accordance with its polarization, each of the two polarizations being substantially completely diffracted along separate ones of the two remaining axes, with a small percentage of each transmitted along the original axis. Utilization devices are located along the three axes, or the two axes orthogonal to that of the incident beam thus split according to its polarization.

In all of the embodiments of the invention, the holographic optical component is formed by coherent light beams having a vertical polarization relative to their angle of incidence on the holographic medium and their angular separation is such as to create, within the medium, a Bragg angle of approximately 45°.

DESCRIPTION OF THE DRAWINGS

The various features of the present invention will be more readily apparent from the following detailed description, taken in conjunction with the accompanying drawings, in which.

DETAILED DESCRIPTION

Figure 1:
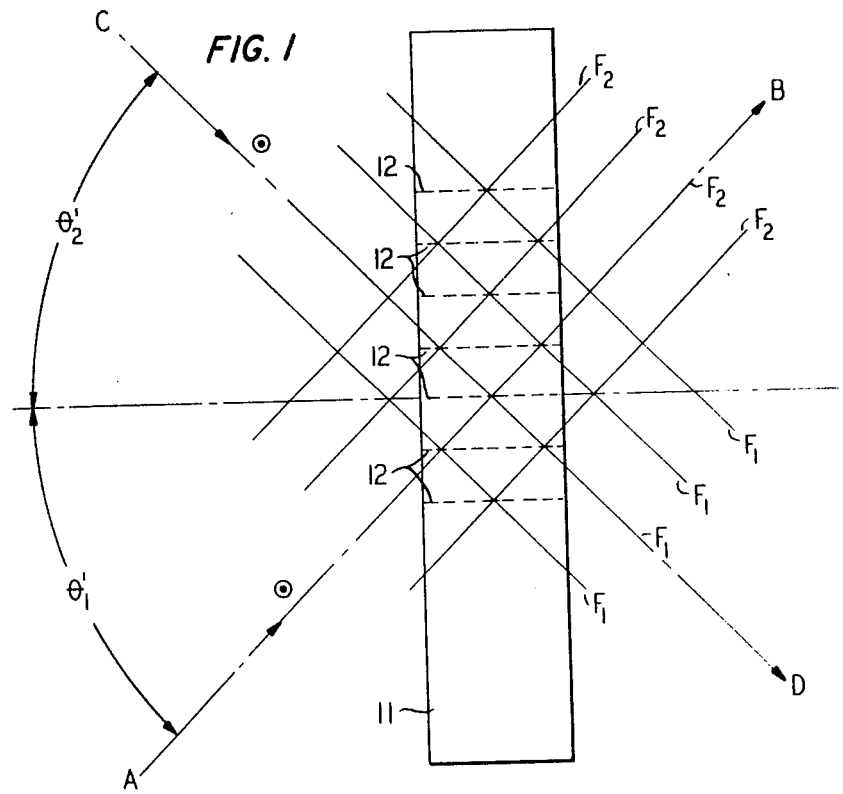
FIG. 1 is a diagrammatic view of the formation of one illustrative embodiment of the invention.

FIG. 1 depicts the formation of a polarization sensitive member 11, intended for use as a polarizer.

Member 11 is a relatively thick (in relation to the wavelength of the light with which it is to be used) e.g., 15 microns piece of high efficiency holographic material, such as, for example, dichromated gelatin. First and second plane waves, as indicated by the wavefront planes $F_1$ and $F_2$ and their respective normals A–B and C–D, are directed from a suitable source or sources, not shown, at angles $\theta_1'$ and $\theta_2'$ respectively, so that they pass through member 11 at angles $\theta_1$, and $\theta_2$ where $\theta_1$ plus $\theta_2$ are equal to 90°. As depicted in FIG. 1, angles $\theta_1'$ and $\theta_2'$ are each shown as approximately 45° to the axis of member 11, and equal to $\theta_1$ and $\theta_2$, respectively. In practice, angles $\theta_1'$ and $\theta_2'$ will, where the index of refraction of the material of member 11 is greater than that of air, be greater than angles $\theta_1$ and $\theta_2$ to allow for the refraction at the interface. In extreme cases, index matching means or beam diffracting means, such as glass prisms or wedges, may be required to achieve the proper angles within the medium. It is not necessary that angles $\theta_1$ and $\theta_2$ be equal, but that their sum equal 90°.

Both plane waves $F_1$ and $F_2$ are polarized vertically with respect to the plane of incidence, which in FIG. 1 is the plane of the paper.

As the waves pass through member 11 they generate therein planes 12 of maximum index of refraction change at the points of interference where they are in phase, and of lesser index of refraction change where they are out of phase. As shown in FIG. 1, these generated planes 12 are perpendicular to the plane of incidence and they bisect the angle between the two wavefronts, giving a Bragg reflection angle at the planes of 45°. The planes need not, however, be perpendicular to the face of the member 11, as shown in FIG. 1.

When the member 11 has been exposed to the plane waves $F_1$ and $F_2$, it is then developed in a suitable manner, such as that shown, for example, in copending U.S. Pat. application Ser. No. 676,866 of T. A. Shankoff filed Oct. 20, 1967, to fix the index of refraction changes. The result is a substantially transparent element having a plurality of transversely extending fringe planes which have a Bragg reflection angle of 45°.

Figure 2:
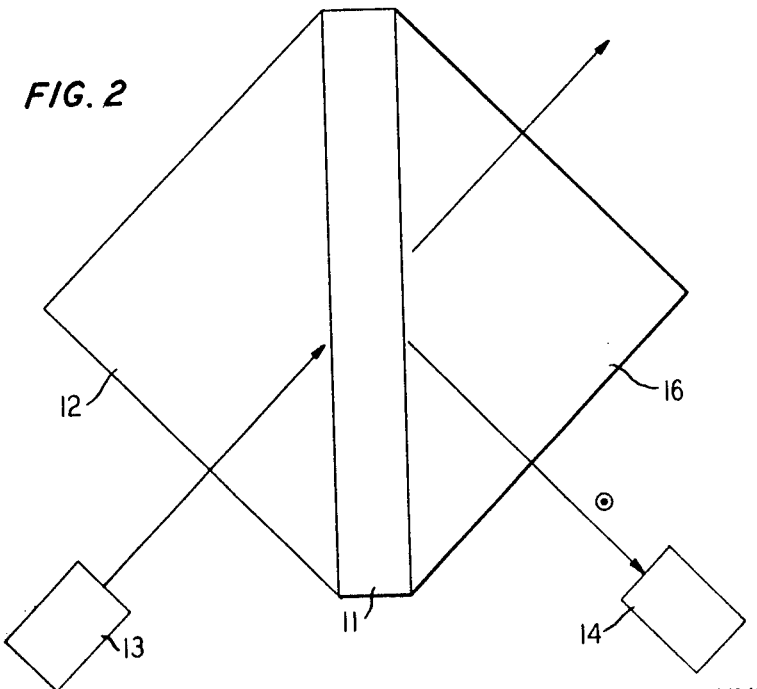
FIG. 2 is a view of the embodiment as formed in use as a polarizer.

In FIG. 2 there is shown an arrangement for using the member 11 of FIG. 1 as a polarization discriminator. The arrangement of FIG. 2 comprises the member 11, formed as described in the discussion of FIG. 1 mounted between prism shaped support members 12 and 16 which also function as index of refraction matching members and are made of a suitable material such as glass or quartz, having an index of refraction approximating that of the material of member 11. Where index matching is not necessary, other means of support for member 11 may of course be used, as may other index matching arrangements.

A beam of coherent light from any suitable source 13, and of a wavelength substantially the same as that of the forming beams, is directed into one face of member 12 to impinge on the fringe planes of member 11 at the Bragg angle. Regardless of the polarization of the beam from source 13, only the vertical i.e., into or out of the plane of the paper as shown in FIG. 2, polarization component is reflected from the fringe planes at the Bragg angle and directed towards a utilization device 14, which may take any of a number of forms. Approximately 95 percent of the light of vertical polarization is directed along the path toward device 14, while the remainder of the light passes straight through member 11. The loss of light of the desired polarization is only approximately 5 percent or even less, which is much less than for currently available polarizers or polarization discriminators.

Figure 3:
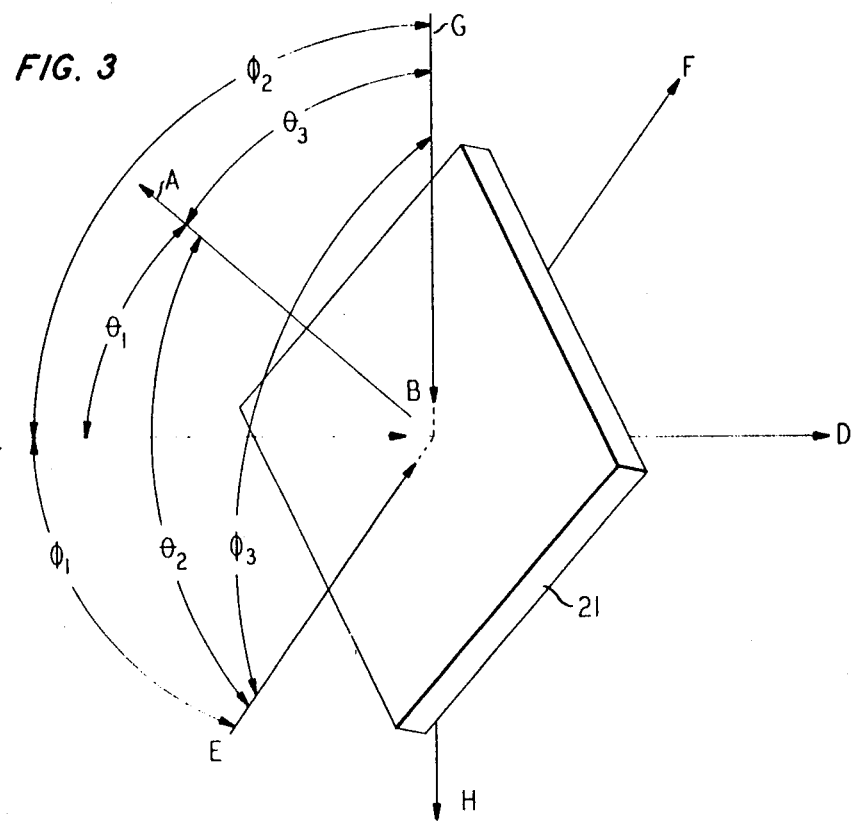
FIG. 3 is a diagrammatic view of the formation of a second illustrative embodiment of the invention.

In FIG. 3 there is shown the formation of a beam splitter utilizing the principles set forth in the foregoing.

A member 21 of suitable transparent recording material is impinged by first and second coherent beams CD and EF which are polarized vertically with respect to their plane of incidence. The beams are oriented at 90° with respect to each other, that is, angle $\Phi$, is equal to 90°, and both beams are at an angle of approximately 54.7° to the normal AB to the surface plane of member 21, that is, $\theta_1=\theta_2=54.7°$. As was the case with the arrangement of FIG. 1, where the index of refraction of the material of member 21 differs from that of air, it is necessary, in extreme cases, or convenient in most cases, to utilize some sort of matching arrangement, such as that shown in FIG. 2. The angles given above for $\theta$ and $\Phi$ are, in actuality, the angles within the body of member 21, but, for simplicity, they are shown as the angles outside of member 21.

The plane waves thus directed into member 21 interfere with each other as discussed in connection with FIG. 1 to produce a plurality of fringe or Bragg reflection planes.

After exposure to the two beams directed along CD and EF, the member 21 is next exposed to a pair of beams polarized vertically with respect to their plane of incidence, one being directed along CD and the other along GH. The beam GH forms an angle of 90° with both CD and EF, that is, $\theta_2$ and $\theta_3$ are both 90°, and an angle of 54.7° with AB, that is, $\theta_3$ is equal to 54.7°. It can be seen that the beam directed along CD is polarized parallel to the plane of incidence of the first two beams CD and EF. This second exposure produces a second set of Bragg planes within the member 21.

After having been thus doubly exposed, the material of member 21 is then developed in any suitable manner, such as to fix the holographic image, i.e., the double set of Bragg planes.

Figure 4:
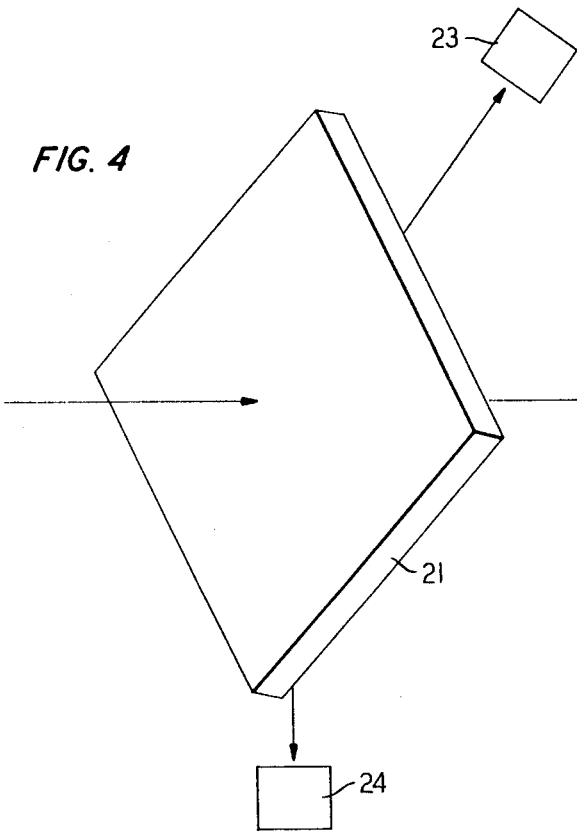
FIG. 4 is a view of the embodiment as formed in use as a beam splitter.

In FIG. 4 there is shown the member 21 of FIG. 3 in use as a beam splitter. For simplicity, mounting or support means, which may take any of a number of suitable forms, have not been shown. For the same reason, any necessary or desirable index matching means has not been shown.

A beam of coherent light from any suitable source 22 is directed toward member 21 along the path of one of the hologram forming beams of FIG. 3. In FIG. 4, this is shown as the path CD of FIG. 3, and the member 21 is oriented the same with respect thereto as in FIG. 3. The beam from source 23 may have any polarization. As the beam passes through member 21 it is split in accordance with its horizontal and vertical polarization components (relative to the original plane of incidence in the formation of the hologram) into two beams, one vertically polarized and the other horizontally polarized. The vertically polarized portion exits from member 21 along the original path EF, and the horizontally polarized portion exits along the original path GH. In like manner, any beam directed along any of the original forming paths will, so long as it contains components of both horizontal and vertical polarization, be split into two beams exiting from member 21 along the two remaining original paths. Since the operation of member 21 is highly efficient, only a very small portion, i.e., a few percent, of the beam is wasted.

Suitable utilization devices 23 and 24 responsive to a single polarization may be placed to receive the different polarized portions of the beam. A third device, not shown, may also be placed to receive that portion of a split beam exiting along the path CD.

The foregoing embodiments of the invention have been for purposes of illustrating the principles thereof. Numerous other embodiments utilizing these principles may occur to workers skilled in the art without departing from the spirit and scope of the invention.

What is claimed is:

1. A polarization sensitive holographic optical component for separating out one plane polarized light beam from an incident unpolarized light beam, comprising a thick member of substantially transparent holographic material having a plurality of substantially parallel fringe planes of index of refraction change extending transversely of the member and having a Bragg reflection angle of approximately 45° said planes being the interference pattern formed by a pair of plane wave coherent light beams directed to intersect within the material at a 90° angle, and being both polarized perpendicularly to the plane of incidence on said member.

2. An optical component as claimed in claim 1 wherein said holographic material is a dichromated gelatin.

3. A polarization sensitive holographic optical component for separating out one plane polarized light beam from an incident unpolarized light beam, comprising a thick member of substantially transparent holographic material having a first set of substantially parallel fringe planes of index of refraction change extending transversely of the member and having a Bragg reflection angle of approximately 45°, said planes being the interference pattern formed by a first pair of plane wave coherent light beams directed to intersect within the material at a 90° angle, and being both polarized perpendicularly to their plane of incidence on said member, said member further having a second set of substantially parallel fringe planes of index of refraction change extending transversely of the member and having a Bragg reflection angle of approximately 45°, said planes of said second set being the interference pattern formed by a second pair of plane wave coherent light beams, one of the beams of said second pair being one of the beams of said first pair, said second pair of beams being directed to intersect within the material at a 90° angle, and being both polarized perpendicularly to their plane of incidence and parallel to the plane of incidence of said first pair of beams, the plane of said member being oriented equiangularly with respect to all of the beams of both pairs.

4. An optical component as claimed in claim 3 wherein the other of the beams of said second pair is directed at right angles to both of the beams of said first pair.

5. An optical component as claimed in claim 3 wherein the plane of said member is oriented at approximately 54.7° to the beams of said first and second pairs.

6. An optical component as claimed in claim 3 wherein said holographic material is dichromated gelatin.

7. An optical polarizing system comprising a thick member of substantially transparent dielectric material having a hologram transmission grating formed therein comprising a sinusoidal refractive index variation forming a plurality of equally spaced parallel fringe planes extending across the thickness dimension of said member and having a Bragg reflection angle of approximately 45°, said planes being the interference pattern formed by a pair of plane wave coherent light beams directed to intersect within the material at a 90° angle, and being both polarized perpendicularly to the plane of incidence on said member, means for directing an unpolarized beam of coherent light into said grating at the Bragg angle of incidence on said planes whereby plane polarized light of one orientation is diffracted in one direction by said grating and plane polarized light of different orientation is transmitted in another direction through said grating, and means on the other side of said grating from said directing means to receive the diffracted light.

* * * * *

UNITED STATES PATENT OFFICE
CERTIFICATE OF CORRECTION

Patent No. 3,622,220              Dated  November 23, 1971

Inventor(s) Herwig W. Kogelnik

It is certified that error appears in the above-identified patent and that said Letters Patent are hereby corrected as shown below:

Column 1, line 22, after "Wollaston" change "prism" to --prisms--.
(page 1, line 18 of spec.)

Column 2, line 16, after "light" change "or" to --of--.
(page 3, line 23 of spec.)

Column 3, line 63, after "angle" change "$\phi$," to --$\phi_1$--.
(page 7, line 16 of spec.)

Column 4, line 5, change "$\theta_2$" and "$\theta_3$" to --$\phi_2$-- and --$\phi_3$--.
(page 8, line 4 of spec.)

Column 4, line 57, after "45°" add a comma.
(Claim 1, line 6)

Signed and sealed this 27th day of June 1972.

(SEAL)
Attest:

EDWARD M. FLETCHER, JR.            ROBERT GOTTSCHALK
Attesting Officer                  Commissioner of Patents